Dec. 6, 1938.  J. COLLINS ET AL  2,139,328
SNOW PLOW ATTACHMENT
Filed Jan. 28, 1938  2 Sheets-Sheet 1
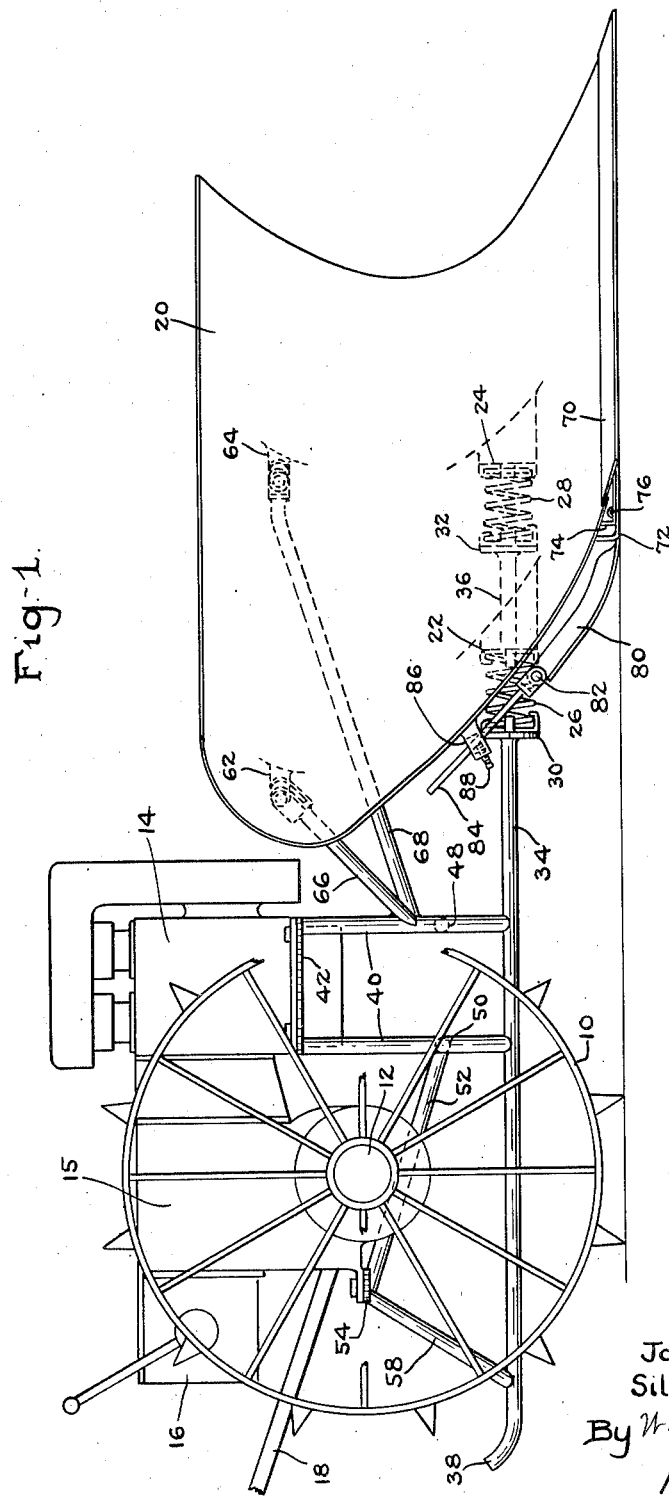
Inventors:
John Collins.
Silas M. Wright.
By Whiteley and Ruckman
Attorneys.

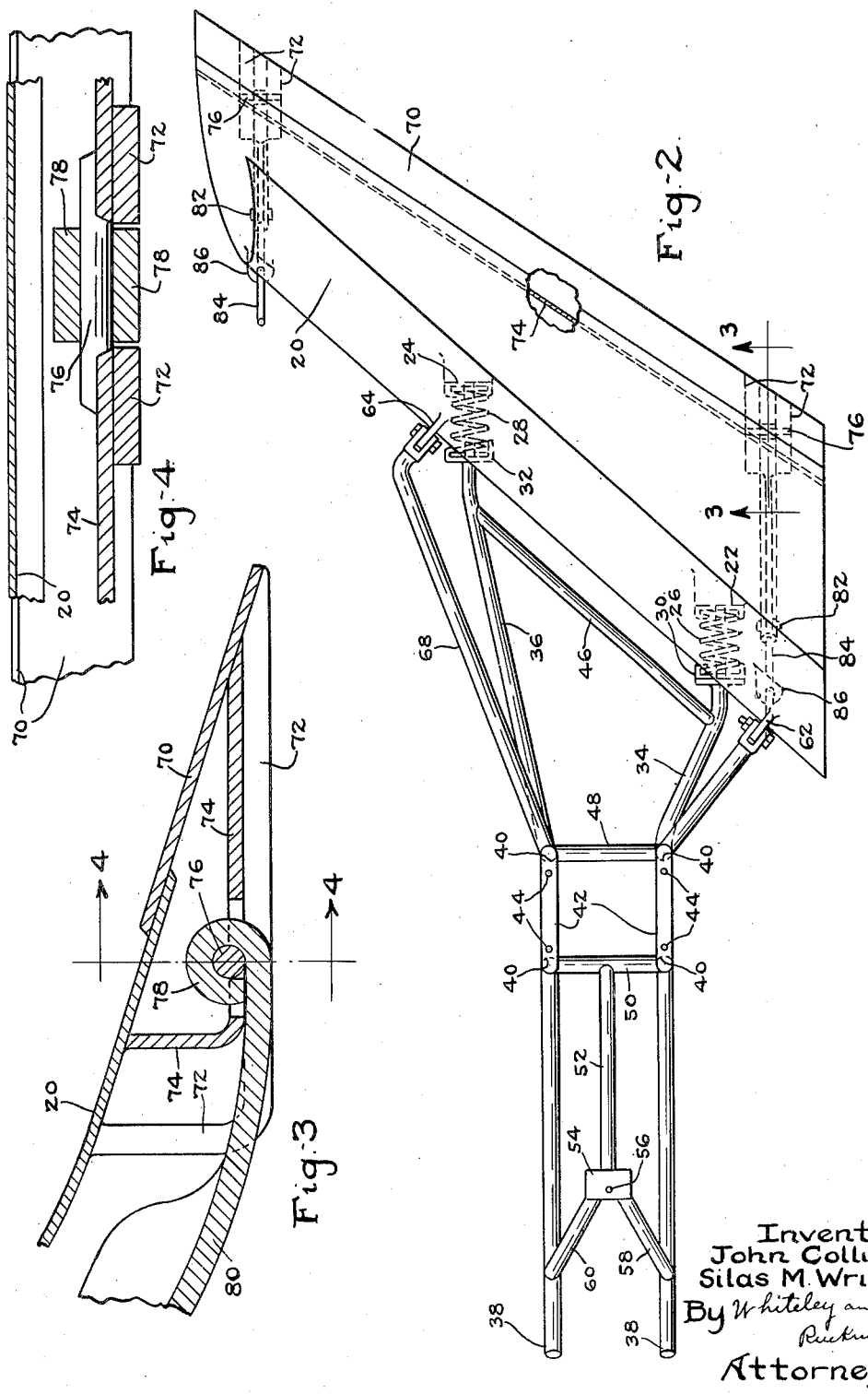

Patented Dec. 6, 1938

2,139,328

UNITED STATES PATENT OFFICE 2,139,328

SNOW PLOW ATTACHMENT

John Collins, Mound, and Silas M. Wright, Wayzata, Minn.

Application January 28, 1938, Serial No. 187,426

4 Claims. (Cl. 37—42)

Our invention relates to snow plow attachments. It relates more particularly to such attachments by means of which a blade may be attached in front of a tractor to be pushed along thereby and deliver snow to the side. One object of the invention is to provide shock absorbing means between the blade and the tractor in order to prevent undue strains in case the blade strikes an obstruction. Another object is to provide runners for supporting the blade from the ground. Another object is to provide means for adjusting the blade up and down to meet various conditions of surfaces to be cleaned from snow. A more specific object is to provide in combination with means for attaching the blade to operate in front of the tractor, means whereby the blade may be given rocking movement up and down around an axle of the tractor and means for securing the blade in the adjusted position obtained by the rocking movement thereof.

The novel features which we believe to be characteristic of our invention are set forth with particularity in the appended claims. The invention itself, however, both as to organization and method of operation, together with additional objects and advantages will be best understood from the following description of a specific embodiment in which, Fig. 1 is a side elevational view of the device attached to a tractor.

Fig. 2 is a top plan view of the device detached from the tractor.

Fig. 3 is a view in vertical section on the line 3—3 of Fig. 2 and on an enlarged scale.

Fig. 4 is a view in vertical section on the line 4—4 of Fig. 3.

In Fig. 1, the device is shown attached to the front of a garden tractor mounted on two wheels one of which is designated by the numeral 10, these wheels being connected by an axle 12 which supports a frame carrying a motor casing 14, a differential casing 15, a transmission casing 16 and rearwardly projecting handles, one of which is designated by the numeral 18. By means of these handles, the frame of the tractor may be rocked upon the axle 12.

Our tractor attachment includes a snow plow blade 20 which as shown in Figs. 1 and 2 consists of a blade which is inclined in order to throw snow to the side of the tractor when employed to push the snow plow. Two socket members 22 and 24 are secured to the rear of the blade 20 near the lower portion thereof as by welding. These socket members receive the forward ends of coiled springs 26 and 28 respectively, the rear ends of which are received in socket members 30 and 32 carried by the forward ends of rods 34 and 36 respectively. These rods at first converge toward each other and then continue rearwardly to form portions parallel to each other as shown in Fig. 2, the rear ends being turned upwardly as indicated at 38 in Fig. 1. At the front of the parallel portions of the rods 34 and 36, posts 40 extend up vertically and carry plates 42 provided with holes 44 for bolting to flanges on the lower end of the casing 14. The rods 34 and 36 near their forward ends are connected by a rod 46. Opposite pairs of the posts 40 are connected by rods 48 and 50. The rear one 50 of these rods is connected by a rod 52 with a plate 54 having a hole 56 for bolting to a flange formed on the lower end of the casing 15. The plate 54 in turn is connected by inclined posts 58 and 60 with the rear portions of the rods 34 and 36 respectively. Secured to the rear face of the blade 20 toward the upper portion thereof are lugs 62 and 64 to which are pivoted the forward ends of rods 66 and 68 respectively whose rear ends are secured to the two forward posts 40 respectively as shown in Fig. 2.

As shown in Fig. 3 a plate 70 of hard or wear resisting metal is welded to the lower portion of the blade 20. Also welded to the lower portion of the blade 20 including the plate 70 are pairs of spaced right angular pieces 72 which constitute runner members for the blade. Welded to the runner members 72 and to the blade is a right angular strip 74 which has openings cut therein to correspond with the spaces between the pairs of pieces 72. Welded to the strip 74 across the openings thus provided are pins 76 which constitute bearings for eyes 78 formed on the lower ends of auxiliary runner members 80. Attached by pivots 82 to the upper ends of the members 80 are rods 84 which pass through openings formed in lugs 86 secured to the rear face of the blade. The rods 84 are held in adjustable position by set screws 88 as shown in Fig. 1. The members 80 and the rods 84 in effect constitute toggle joints near each of the two ends of the blade 20. In the position shown in Figs. 1 and 3 the blade 20 is supported on the ground by the runner members 72. However by pushing down on the rods 84 and then securing them by the set screws 88, the blade 20 will be adjusted to a higher position above the ground due to the fact that the toggle joints are moved downwardly from their straight position. This movement of the blade is permitted because the blade and its connections with the tractor are capable of rocking movement around the axle 12.

The operation and advantages of our invention will be readily understood in connection with the foregoing description and the accompanying drawings. The connections carried by the blade 20 are so constructed and arranged that the blade may be quickly attached in front of a tractor such as a garden tractor to be pushed along by the tractor with side delivery of snow by the blade. The tractor is easily manipulated and controlled by the operator who in the embodiment shown walks behind and grasps the handles by means of which he may guide the device with a high degree of precision. Upon bearing down upon the handles, the blade 20 will be lifted in case it is desired to clear it from obstructions. The blade may be lifted to a considerable extent and with the rear end portions of the connections then resting upon the ground. In case the blade strikes an obstruction, the springs 26 and 28 serve as shock absorbers to prevent undue strain, the pivotal attachment of the rods 66 and 68 permitting backward movement of the blade. In order to meet various conditions of the surfaces to be cleaned from snow, the blade may be adjusted up and down, the runner members 72 or 80 in all cases serving as a support for the blade.

We claim:

1. In a device of the character described, the combination of a blade, means for attaching said blade to the front of a tractor to operate in front thereof, pairs of spaced runners secured to the lower portion of said blade, pivot pins secured across the spaces of said pairs of runners respectively, auxiliary runners pivoted at their lower ends upon said pins, rods pivoted to upper ends of said auxiliary runners, and clamping members attached to the rear face of said blade for clamping said rods in adjusted position whereby said auxiliary runners may be raised and lowered.

2. In a device of the character described, the combination of a blade, means for attaching said blade to a tractor to operate in front thereof, said attaching means providing for rocking up and down movement of said blade, pairs of spaced runners secured to the lower portion of said blade, pivot pins secured across the spaces of said pairs of runners respectively, auxiliary runners pivoted at their lower ends upon said pins, rods pivoted to the upper ends of said rods, and clamping members attached to the rear face of said blade for clamping said rods in adjusted position, said rods and auxiliary runners when pushed downwardly with said clamping members released serving to rock said blade upwardly.

3. In combination with a tractor having a motor casing and a differential casing, a snow plow attachment comprising a blade, a pair of rods extending from the rear of said blade near the lower portion thereof, posts extending upwardly from intermediate portions of said rods, plates carried by the upper ends of said posts and adapted to be secured to the motor casing, a rod extending rearwardly from said posts, a plate carried by the rear end of said rod adapted to be secured to the differential casing, posts connecting said plate with the rear portions of said pair of rods respectively, and rods pivotally attached at their forward ends to the upper portion of said blade and attached to said posts at their rear ends.

4. In combination with a tractor having a motor casing and a differential casing, a snow plow attachment comprising a blade, a pair of rods extending from the rear of said blade near the lower portion thereof, posts extending upwardly from intermediate portions of said rods, plates carried by the upper ends of said posts and adapted to be secured to the motor casing, a rod extending rearwardly from said posts, a plate carried by the rear end of said rod adapted to be secured to the differential casing, posts connecting said plate with the rear portions of said pair of rods respectively, rods pivotally attached at their forward ends to the upper portion of said blade and attached to said posts at their rear ends, and a handle device extending rearwardly from the tractor by means of which said blade may be given rocking movement around an axle of the tractor.

JOHN COLLINS.
SILAS M. WRIGHT.